Patented Jan. 24, 1950

2,495,232

UNITED STATES PATENT OFFICE 2,495,232

CELLULOSE DERIVATIVES AND PROCESS OF PREPARING SAME

Nicolas Drisch and René Fays, Paris, France, assignors to Comptoir des Textiles Artificiels, a corporation of France No Drawing. Application February 23, 1946, Serial No. 649,777. In France May 25, 1943

Section 1, Public Law 690, August 8, 1946
Patent expires May 25, 1963

10 Claims. (Cl. 260—231)

This invention relates to new and novel cellulosic materials and method of making the same. More particularly, it relates to cellulose derivatives in which the molecular chains of cellulose are chemically united by resinified bridge linkages, and to the method of making the same.

The principal disadvantage of processes of treating natural cellulosic substances for preparing pure cellulose, for example for the paper industry, or of all processes for converting cellulose into yarns, films, fibers, molded products, etc., is the degradation of the raw material. This degradation leads to the formation of products which do not possess many of the properties possessed by the cellulose in its natural state. In particular, the products have a resistance to the action of water which is considerably lower than that possessed by the cellulose prior to its treatment.

Natural cellulose is today considered to be a high polymer composed of bundles of long chainlike molecules arranged more or less parallel to the axes of the fibers. When cellulose in its natural state is treated without destroying the fibrous nature thereof, for example in the purification of wood, the cellulose is hydrolyzed or oxidized, with the consequence that the long chain like molecules are broken into smaller chains but without any internal disruption. In processes wherein cellulose is dissolved, the molecular structure is disorganized or destroyed to a great extent in order to permit dissolution of the cellulosic material. When the solution is to be spun or cast into shaped articles, such as yarns, films, etc., the solution must have certain properties, which can be acquired only by degradation of the molecular chains, that is, by more or less shortening of the chains. In spinning the solutions finally obtained, attempts are made to reconstruct oriented structures, that is, to create a new organization of the cellulosic chains, which were degraded by the different treatments to which they were subjected. The shortening of the chains in both of the aforementioned procedures, and particularly the disorganization of the chains in the second procedure, results in the liberation of numerous hydroxyl groups, i. e. strongly polar hydroxyl groups that possess a great affinity for water. Consequently, structures, such as yarns, films, etc., formed of such materials, possess a great affinity for water and when wetted with water not only do such structures swell but the strength thereof is substantially reduced with respect to resistance to traction and other mechanical factors.

Attempts have been made to improve the properties of the structures by (1) esterification or etherification of more or less of the free hydroxyl groups especially by hydrophobic groups, and (2) blocking the free hydroxyl groups by forming bridges between the chains.

The treatment of cellulosic substances containing free hydroxyl groups with formaldehyde or formaldehyde-producing substances, and known as "stenosation," is generally believed to form methylenic bridges between the cellulose chains. Though stenosation, which has been studied to a great extent both theoretically and practically, reduced the hydrophilous nature of the cellulose substances treated, nevertheless, it possessed disadvantages which led to its discontinuance after several years of large scale operations. In practicing stenosation, if the conditions were not maintained within very narrow limits, the results obtained were irregular. Furthermore, since stenosation required prolonged heating in the presence of acid catalysts under such conditions that hydrolyzed cellulose, the cellulose was depolymerized to a greater or lesser degree. Thus, stenosation improved certain properties of the structure but the depolymerization caused deterioration. Either of such effects could be made to predominate depending upon conditions. Under favorable conditions it was possible to mask the depolymerization by blocking the free hydroxyl groups resulting therefrom. In such case, when stenosation was applied to artificial textiles of regenerated cellulose, the resistance to traction (tensile strength) was more or less increased, but elongation, resistance to friction, and knotting, as well as affinity for dye-stuffs, were greatly reduced and diminished. The formaldehyde cellulose linkage was very sensitive to acid hydrolysis. Hence, though swelling in water and alkalis was greatly decreased, however if the stenosated material were treated with acids, the effects were nullified and swelling in aqueous liquids was increased considerably.

Treatment of regenerated cellulose with long chain bifunctional reagents, for example stearyl di-isocyanate, is also known and also results in bridges between the cellulose chains producing analogous and in some cases even superior and more stable effects than stenosation. However, such treatment involves the use of little known and expensive products and up to the present time has not progressed beyond the laboratory stage.

Resins have also been physically associated with cellulose materials. However, in such case, the resins were not chemically combined with the cellulose but existed as coatings more or less on the individual fibers.

An object of this invention is to provide new and novel cellulosic derivatives.

Another object of this invention is to provide cellulose derivatives in which the molecular chains of cellulose are chemically united by resinified bridge linkages.

An additional object of this invention is to provide cellulose derivatives in which the hydroxyl groups of the molecule chains of cellulose are etherified and chemically united by methylene groups having a polyarylmethane chain.

A further object of this invention is to provide a new and novel method of producing the cellulose derivatives above referred to.

Other and additional objects will become apparent hereinafter.

The invention is based on the discovery that when cellulosic material having free hydroxyl groups is reacted with a compound (hereinafter more fully explained and called "reagent") having active methylol groups capable of etherifying the cellulose hydroxyl groups and, to the benefit of their alcoholic groups, reacting among themselves to yield polycondensed nuclei, there is obtained a cellulose derivative having a complex of large molecule nucleus bound to the neighboring cellulose chains by several methylene groups.

The objects of the invention are accomplished, in general, by treating a cellulosic material containing free hydroxyl groups with a bi- or polyfunctional resiniferous compound, such as a resiniferous bi- or polymethyloloxyaryl compound having the general formula

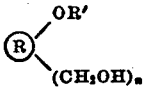

wherein R is an aryl, cyclic or polycyclic group, R' is an alkyl, aryl, acyl group or hydrogen, and $n$ is at least 2, and subjecting the thus treated material to a thermal treatment and preferably in the presence of an acid catalyst. In this reaction, the bi- or polymethyloloxyaryl reagent forms bridge linkages between the cellulose chains, which linkages are converted to resiniform bridges. The result is a complex of large molecule nucleus bound to neighboring cellulose chains by several methylene groups and the product is herein designated by the term "resyl cellulose."

The details and manner of practicing the invention will become apparent from the following examples, wherein the proportions set forth are by weight:

Example 1

To a dispersion of highly hydrated cellulose fibers, produced by prolonged beating in a beater of the known type, such as a Hollander, and a subsequent strong bleaching, was added 5% of trimethylolphenol based on the weight of the cellulosic material in the dispersion. The dispersion was then fed onto the screen of a paper-making machine of any of the known types and converted into paper. While the paper was on the screen, it was wetted with a 2% aqueous solution of lactic acid. After drying in the usual manner, the paper was passed over calender rolls at a temperature of 140° C.

The resulting paper was of excellent quality and can be used as a substitute for vegetable parchment for wrapping fatty materials. It can also be used in dialysis of colloidal solutions.

Example 2

To a dispersion of cellulose fibers produced as set forth in Example 1, there were added approximately 5% of trimethylolphenol based on the cellulosic material and lactic acid in an amount of approximately 2% based on the quantity of the trimethylolphenol. The resulting composition was then converted into paper in the usual manner and, after drying in the usual manner, passed over calender rolls at 140° C.

Example 3

To a film-forming solution of cellulose xanthogenate containing 7% to 10% cellulose in 5% aqueous caustic soda was added 10% of trimethylolphenol based on the weight of the cellulose. The solution, after being cast onto a glass plate to form a thin film, was heated at 80° C. until coagulation had been effected, and thereafter finally heated for 1 hour at 120° C. The film, after stripping from the glass plate, was dipped into an aqueous bath containing 70 grs. of sulfuric acid per liter. After thoroughly washing with water, the film was rinsed with a 2% aqueous lactic acid soluton and dried on the plate at a final temperature of 120° C.

The film produced was perfectly transparent and became only very slightly deformed upon wetting, whereas foils made under the same conditions but without the resiniferous agent were very sensitive to water, swelled considerably and became opaque.

Example 4

Same as Example 3, except that the film-forming solution was glycol cellulose (containing 0.5 ethoxy group per glucose unit) in 5% aqueous caustic soda solution.

The trimethylolphenol utilized in the examples was prepared in accordance with the method of Manasse and Lederer (Berichte der deutschen chemischen Gesellschaft, 1894, vol. 27, p. 2409), wherein phenol is condensed with formaldehyde, in the form of formol, in the proportion of 3 mols of formaldehyde per phenol radical, in the presence of an alkaline medium, such as caustic soda, lime, organic bases, etc., at moderate temperatures, for example not exceeding 65° C., the reaction being completed in about 2½ hours. At ordinary temperature (20° C.), the reaction will take 48 hours. The end of the reaction is marked by complete absorption of the formol. The alkali is then carefully neutralized. Formation of resinous products must be avoided. The reaction product is a mixture of the phenyl di- and trialcohol, the latter (trimethylolphenol) preponderating and being present in an amount of more than 85%. When a different phenolic derivative is employed as the raw material, the poly-alcohol phenol is prepared in a similar manner to that previously described except that the quantity of formol is determined by calculation of the maximum number of methylol radicals which can be fixed to the nucleus of the phenolic derivative used.

The polymethylolphenols are the simplest of the compounds which have proven to be the most suitable reagent for the preparation of the new cellulose derivatives. The invention, however, is not restricted to polymethylolphenols. In general, any bi- or poly-functional resiniferous compound, and more especially bi- or polymethyloloxyaryls which in the presence of heat and preferably in the presence of an acid catalyst form resiniform bridge linkages by etherification of the hydroxy groups of the cellulose material and internal condensation and having the following general formula, can be used:

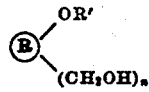

in which R is an aryl, cyclic or polycyclic group, R' is an alkyl, aryl, acyl group or hydrogen, and $n$ is at least 2. The radical R may comprise two or more phenyl groups combined by direct saturation of their valences or by means of an oxygen, carbonyl, amine, hydrocarbon, etc. bridge. It may also comprise polycyclic groups themselves united as explained above.

The reaction takes place between the extremely active hydroxyl groups of the cellulosic chains and the methylol groups, the latter also reacting with each other to yield a polycondensed nucleus. The reaction yields a resiniform bridge linkage between cellulosic chains comprising a complex of a large molecule nucleus bound to neighboring cellulosic chains by several methylene groups and forms what might be termed a polyaryl-methane-methylene ether of cellulose.

The speed of the reaction depends on the temperature and acidity of the medium. In general, the higher the temperature and the greater the acidity of the medium, the faster the reaction. However, operating conditions must be selected so that the cellulosic chains do not undergo any appreciable degradation by the action of the catalyst, and the duration of the reaction is in accordance with the requirements of industrial operation.

In practice, the reaction is carried out by heating the cellulosic material containing the reagent preferably in the presence of weak catalysts having a dissociation constant of preferably less than or about $10^{-3}$. The temperature and duration of the thermal treatment (i. e. heating) may be moderated if the catalyst is more active, but, in general, the temperature varies inversely with the duration of the treatment.

Organic acids, such as lactic or acetic, can be used as catalysts for the thermal condensation polymerization. Polymerization in the presence of from 2% to 3% of these acids based on the quantity of the reagent requires about 2 hours at temperatures of from 115° C.–120° C., or about 1 hour at temperatures of from 120° C.–125° C., or about 30 minutes at temperatures of from 130° C.–135° C., etc., the duration varying inversely with the temperature. The temperature can be decreased slightly if a larger quantity of acid or a stronger acid is used. The temperature of the thermal treatment can be decreased considerably if mineral acid catalysts are used. Thus, the required polymerization can be obtained by a thermal treatment in the presence of 2% phosphoric acid (based on the weight of the reagent) for about 2 hours at less than 110° C., such as 90° C., or for a lesser period of time at a higher temperature.

The mode of incorporating the reagent in the cellulosic material depends on the state or condition of the cellulosic material. When the cellulosic material is in the form of a solid, it can be impregnated with an appropriate solution containing the reagent in an appropriate concentration. When the cellulosic material is in the form of a dispersion, the desired amount of reagent can be directly added to the dispersion.

When the reagent is added to a solution of a cellulosic substance from which the product is to be obtained by coagulation, the reagent is also precipitated during coagulation of the solution and it is thus associated with the coagulated material and is fixed on it upon subjecting it to a suitable thermal treatment. In general, satisfactory results are obtained when from 1 to 5 mols of the reagent per 100 glucose units ($C_6$) are used.

The acid catalyst can be added at any stage of the process prior to the thermal treatment. When the cellulosic material is in a solid state at the time that it is impregnated with the reagent, the catalyst can be incorporated in the reagent-impregnating solution and, after drying the thus treated cellulosic material, subjected to the thermal treatment. Alternatively, the catalyst can be added subsequently to the impregnation of the solid cellulosic material with the reagent, in which case the cellulosic material containing the reagent can be dried or not prior to the addition of the catalyst. After addition of the catalyst, the cellulosic material is dried and then subjected to the thermal treatment. When the cellulosic material is in a dispersed state, the catalyst can be added to the dispersion simultaneously with or subsequent to the addition of the reagent. Thereafter, the dispersion is coagulated and the coagulated material subjected to the thermal treatment preferably after a preliminary drying. Alternately, the dispersion of the cellulosic material containing the reagent can be coagulated and the catalyst added to the coagulated material which is thereafter subjected to the thermal treatment preferably after a preliminary drying. The coagulated material may be dried or not as desired prior to the addition of the catalyst.

When the catalyst is added to the solid cellulosic material subsequent to the incorporation of the reagent, it is applied in the form of a solution in an appropriate solvent, such as water, in any convenient manner such as spraying, impregnating baths, etc. In general, the quantity of catalyst which is used is from 2% to 3% by weight of the quantity of the reagent employed.

In the preceding embodiments, the drying and thermal treatments can be combined and carried out simultaneously.

If the thermal threatment is carried out under conditions assuring sufficiently rapid reaction, it can be carried out continuously in an appropriate apparatus.

The cellulosic material impregnated with the reagent, such as trimethylolphenol, can be kept for a substantial period of time without any polymerization reaction taking place. Thus, for example, the material may be converted into an appropriate material, for example into fabric in the case of yarn, and the polymerization reaction carried out on the finished product.

It has been suggested to incorporate resols in cellulosic materials, but the action of these resols or resins is not at all comparable to the reaction of the instant invention. The resols are physically associated with the cellulosic materials and do not chemically react therewith. In this invention, the reagent is a non-resinous compound, i. e. a non-polymerized compound having a clearly defined chemical structure and containing a large number of free hydroxyl groups which chemically combine and react with those of the cellulosic material to form resiniferous bridge linkages as hereinbefore described.

When the cellulose derivatives of this invention herein called resyl cellulose, stenosated cellulose, and cellulose impregnated with resols, are treated with warm dilute acids, hydrolysis is observed in all instances. However, the resyl cellulose, although degraded, swells but slightly, whereas the stenosated material and the cellulose impregnated with the resol swell to a fairly high degree.

The resyl cellulose has greatly diminished swelling properties, that is, absorbs much less water than the cellulose which has been converted into the resyl cellulose. To determine swelling, the material is impregnated with water and dried for 10 minutes in a centrifugal drier 25 cm. in diameter and rotating at a speed of 3,000 R. P. M. Swelling expressed as percentages of water is of the order of 100% or more for ordinary cellulose, whereas resyl cellulose of this invention shows a swelling of the order of 30%, 20% or even less. Moreover, this effect can be attained by the application of small quantities of reagent, such as, for example, of the order of from 1 to 5 mols of reagent per 100 glucose ($C_6$) units in the cellulose.

The activity of the reagent may be expressed by the formula $$A = 100\left(I - \frac{x}{y}\right)$$

in which A designates the activity of the reagent, that is, the proportional decrease in swelling, $x$, the observed swelling of a cellulosic material treated with the reagent, and $y$, the swelling of untreated cellulosic material.

The following results were obtained in a series of comparison tests:

| Reagent | Activity A |
| --- | --- |
| Trimethylolphenol | 80 |
| Trimethylol-o-cresol | 55 |
| Resol (1 mol phenol+3 mols formaldehyde) polymerized in alkaline medium, with heat | 23 |

The superiority of the trimethylolphenols over more highly condensed compounds which have a much lower activity is clearly shown by the above table.

In general, the resyl celluloses, in addition to the properties aforementioned, also possess the following properties:

(1) Swell very slightly in water and alkalis;
(2) Are very slightly soluble in water and alkalis;
(3) Slight loss of mechanical strength in the presence of water and dilute alkali or dilute acids, even after prolonged contact;
(4) Slight sensitivity towards aqueous liquid in general;
(5) Slow wetting; and
(6) Insoluble in cuprammonium solutions.

Ordinary regenerated cellulose is completely disintegrated by treatment with 10% caustic soda solution for 2 hours and greatly so by treatment with 6% caustic soda. The resyl cellulose obtained by treating regenerated cellulose in accordance with this invention is affected to a very slight extent by treatment with 10% caustic for 2 hours. Resistance to 2% sulfuric acid at 95° C. for 1 hour, as measured by kilometric loss of resistance or strength, is twice as small for resyl cellulose as for the regenerated cellulose used as the raw material in its preparation.

Best results from the point of view of improvement of the properties of the cellulosic material by conversion to resyl cellulose are obtained with little oriented or greatly degraded cellulose, that is, with cellulosic materials having a large number of free hydroxyl groups capable of reacting with the reagent, though improvement in properties of cellulosic materials by conversion to resyl cellulose is also obtained with cellulosic materials containing a smaller number of free reactive hydroxyl groups. Decided improvement in properties can be obtained by the use of small quantities of the reagent, such as for example from 1 to 5 mols of reagent per 100 glucose ($C_6$) units in the cellulose.

The invention is not restricted to any cellulosic material. It is applicable to any cellulosic material containing free hydroxyl groups, such as natural cellulose, regenerated cellulose, cellulosic derivatives, etc. The reagent can be incorporated in a preformed article of a cellulosic material and thereafter effecting the reaction. Similarly, it can be incorporated at any stage in the process of producing the shaped structure. Thus, in the treatment of regenerated cellulose articles the reagent can be incorporated in the preformed shaped article or in the solution from which the shaped article is obtained.

The new resyl celluloses of the invention are capable of many varied applications because of their small degree of swelling and their reduced sensitivity to water, and alkaline and acid reagents. The invention is particularly applicable to the manufacture of parchment paper, wrapping paper, foils, films, etc., as herein described. It is also of particular interest in its application to textile filaments, yarns, staple rayon, caps, bands, tubing, films, etc. As disclosed in our copending application, Serial No. 649,778, filed Feb. 23, 1946, the reagent is added to viscose solution which is spun in the usual manner to produce the desired shaped article. After the usual liquid treatments, the regenerated cellulose article containing the reagent is subjected to the thermal treatment in the presence of a catalyst. As disclosed in our copending application, Serial No. 649,779, filed Feb. 23, 1946, the reagent is added to articles such as filaments, yarns, staple rayon, caps, bands, films, tubing, etc. formed of regenerated cellulose and thereafter the article at a pH of less than 7, and preferably about 5, is subjected to the thermal treatment.

Since it is obvious that various changes and modifications may be made in the above description without departing from the nature of spirit thereof, this invention is not restricted thereto except as set forth in the appended claims.

We claim:

1. A cellulose derivative in which the molecular chains of cellulose are chemically united by resinified bridge linkages formed by the reaction of hydroxyl groups of the original material from which the derivative was obtained with a non-resinous polymethylolphenol reagent consisting essentially of a trimethylolphenol.

2. A film consisting essentially of a cellulose derivative as covered by claim 1.

3. A process which comprises reacting, in the presence of heat, a cellulosic material having free hydroxyl groups with a non-resinous, polymethylolphenol reagent capable of forming resiniform bridge linkages between cellulose chains and consisting essentially of a trimethylolphenol.

4. A process as claimed in claim 3, wherein the reaction between the cellulosic material and the polymethylolphenol reagent is carried out in the presence of an acid catalyst.

5. A process as claimed in claim 4, wherein the acid catalyst has a dissociation constant of about 10 to the minus third power, and less.

6. A process as claimed in claim 5, wherein the acid catalyst is an organic acid.

7. A process which comprises incorporating in a cellulosic material having free hydroxyl groups a non-resinous polymethylol reagent capable of forming resiniform bridge linkages between cellulose chains and consisting essentially of a polymethylolphenol, and subjecting the resulting reaction mixture to a thermal treatment in the presence of an acid catalyst to produce resiniform bridge linkages between the cellulose chains.

8. A process which comprises incorporating in a dispersion of a cellulosic material having free hydroxyl groups a non-resinous, polymethylolphenol reagent capable of forming resiniform bridge linkages between cellulose chains and consisting essentially of a polymethylolphenol, coagulating the dispersion, drying the coagulated material, and subjecting the dried coagulated material to a thermal treatment in the presence of an acid catalyst to produce resiniform bridge linkages between the cellulose chains.

9. A process as claimed in claim 8, wherein an acid catalyst is incorporated in the dispersion of the cellulosic material.

10. A process as claimed in claim 8, wherein an acid catalyst is incorporated in the coagulated dispersion.

NICOLAS DRISCH.
RENÉ FAYS.

REFERENCES CITED

The following references are of record in the file of this patent:

UNITED STATES PATENTS

| Number | Name | Date |
| --- | --- | --- |
| 2,175,357 | Maxwell | Oct. 10, 1939 |
| 2,345,543 | Wohnseidler | Mar. 28, 1944 |
| 2,371,313 | Rast | Mar. 13, 1945 |
| 2,407,376 | Maxwell | Sept. 10, 1946 |

FOREIGN PATENTS

| Number | Country | Date |
| --- | --- | --- |
| 338,395 | Germany | June 18, 1921 |
| 523,185 | Great Britain | July 8, 1940 |

OTHER REFERENCES

Granger, "Condensation of Phenols with Formaldehyde," pages 442–447, Industrial and Engineering Chemistry, April 1932.